United States Patent [19]
Fischer et al.

[11] Patent Number: 5,392,392
[45] Date of Patent: Feb. 21, 1995

[54] PARALLEL POLYGON/PIXEL RENDERING ENGINE

[75] Inventors: Douglas A. Fischer; Jennifer A. Graves; Thomas D. Snodgrass, all of Albuquerque, N. Mex.

[73] Assignee: Honeywell Inc., Minneapolis, Minn.

[21] Appl. No.: 4,476

[22] Filed: Jan. 12, 1993

Related U.S. Application Data

[63] Continuation of Ser. No. 732,725, Jul. 18, 1991, abandoned, which is a continuation of Ser. No. 419,722, Oct. 11, 1989, abandoned.

[51] Int. Cl.[6] .............................................. G06F 15/62
[52] U.S. Cl. .................................... 395/162; 395/163; 395/143
[58] Field of Search ............................. 340/747, 728; 395/162–166, 119, 120, 125, 122, 132, 143

[56] References Cited

U.S. PATENT DOCUMENTS

| | | | |
|---|---|---|---|
| 4,862,391 | 8/1989 | Ohhashi | 364/522 |
| 4,924,414 | 5/1990 | Ueda | 340/747 X |
| 4,949,280 | 8/1990 | Littlefield | 364/521 X |
| 4,974,177 | 11/1990 | Nishiguchi | 395/125 |
| 5,060,172 | 10/1991 | Engelse et al. | 395/132 X |
| 5,088,053 | 2/1992 | Sprague et al. | 395/166 |

FOREIGN PATENT DOCUMENTS 0262619  9/1987  European Pat. Off. .

OTHER PUBLICATIONS

Ohhashi, Masahide, Nobuyuki Ikumi, Satoshi Itoh, "A 32B 3-D Graphic Processor Chip With 10M Pixels/s Gouraud Shading", Session XII: Video and Graphics Signal processors, IEEE International Solid State Circuits Conference, vol. 31, 17 Feb. 1988, New York, pp. 168–169.

Primary Examiner—Almis Jankos
Attorney, Agent, or Firm—Ronald E. Champion; Craig J. Lervick

[57] ABSTRACT

A parallel polygon/pixel rendering engine for a digital map capable of producing real-time linear shaded, three dimensional, raster graphics for video generation. The apparatus is suitable for use with avionic display systems, particularly digital map displays which include an instruction and interpreter unit and an image scanner. The apparatus comprises a raster engine, a memory interface and a bit mapped memory. The raster engine further includes a raster engine control and generic interpolation polygon processor interface, an edge interpolator, a line interpolator and a controller for the edge and line interpolators. The raster engine control is electrically connected to receive data from the instruction interface unit and is further electrically connected to the edge interpolator and interpolator controller. The edge interpolator is adapted to receive data from the raster engine control and the line interpolator is electrically connected to receive data from the edge interpolator. A first edge pipeline is connected to a second output of the raster engineer control and a second edge pipeline is connected to an output of the first edge pipeline as well as an output of the edge interpolator. An output from the second stage of the edge pipeline and a plurality of outputs from the line interpolators are then fed to a memory interface which is connected to receive data from the plurality of outputs. A bit mapped memory is also connected to receive data from the memory interface and control signals from a bit mapped memory controller. The bit map memory controller controls the memory interface components and the bit map memory during both normal and test modes.

2 Claims, 8 Drawing Sheets

PARALLEL POLYGON/PIXEL RENDERING ENGINE

U.S. GOVERNMENT RIGHTS

The United States Government has contributed to the design and development of this invention and has thereby acquired certain rights therein.

This is a continuation-in-part of application Ser. No. 07/732,725, filed on Jul. 18, 1991, now abandoned, which is a continuation of application Ser. No. 07/419,722, filed Oct. 1989, now abandoned.

BACKGROUND OF THE INVENTION

This invention is directed generally to a rendering engine architecture for computer graphics and, more specifically, to a parallel polygon/pixel rendering engine for providing three-dimensional Gouraud shaded objects rapidly.

In the computer graphics environment, there is a need to create three-dimensional Gouraud shaded objects rapidly in order to perform high speed operations such as animation. Examples of systems requiring such animation include, but are not limited to, digital map systems, helmet mounted displays and other types of aircraft displays as well as ground based computer graphics systems. In particular, a perspective view digital map system in an airplane cockpit must have the ability to display complex scenes of moving imagery in less than one-tenth of a second in order to assure that the display or display image presents smooth movement when animated.

Known polygon raster engines typically rasterize only one polygon at a time, a single line at a time while using only one rendering engine pipeline. The invention offers an improvement over the prior art by providing an apparatus which rasterizes one polygon at a time by simultaneously creating multiple lines of pixels to rapidly fill the polygon. The simultaneous rendering of multiple lines results in an increase in throughput capability which further enables display animation to be achieved.

While other alternatives to the approach used by the invention are available, they result in systems which are more complex or expensive. For example, one such alternate approach is based upon rasterizing a plurality of polygons in parallel using known single line drawing techniques. However, such an approach requires either a plurality of full frame memories to accommodate the polygons or a way of multiplexing the polygons into frame memory. The first choice using a plurality of memories is expensive, the second choice using multiplexing reduces throughput rates. Both of the above-described methods are complex and costly in comparison to the invention.

Honeywell Inc. of Minneapolis, Minn. has previously applied for a U.S. Pat. Ser. No. 07/307,354, filed Feb. 7, 1989, entitled Generic Interpolation Pipeline Processor by Miller et al., the teachings of which are hereby incorporated into this application by reference in their entirety. Honeywell Inc. has also applied for a United States patent entitled "Memory Interface Controller" Ser. No. 07/299,794, filed Jan. 23, 1989, by Snodgrass et al., the teachings of which are also incorporated herein by reference in their entirety. Miller, et al. teaches a generic interpolation pipeline processor or "GIPP" design to accelerate the polygon draw-and-fill operations used in real-time video display systems. The GIPP performs integer interpolation calculations, such as those found in intensity interpolation shading, at high speed (effectively, for example, 225 million operations per second). A single independent variable is used to calculate two different dependent variables in parallel. Thus, a single GIPP can be used to draw correctly shaded monochrome lines at up to 25 million pixels per second. To ease control of the draw-and-fill process, the GIPP is equipped with an internal counter to allow the drawing of shaded lines by specifying only the values at the end points. The inputs are double-buffered to allow efficient utilization of the chip's speed. The GIPP uses hardware handshaking to read its input data, and supply status bits indicating division by zero or invalid output data. Two GIPPs may be used to draw polygon edges and another one or more may be used to fill between the edges with a minimal amount of extraneous logic. When polygon edges are joined at their end points, a Join signal may be used to avoid writing both new end points into the GIPP. The present invention utilizes a plurality of GIPPs in order to accomplish high speed rendering of graphic display objects.

The memory interface controller (MIC) of Snodgrass, et al. is a memory interface controller apparatus for use in a digital system, such as a graphics display system. The apparatus comprises means for initializing the system memory, means for receiving incoming pixel data and means for performing hidden surface removal on the incoming pixel data as well as means for construction of images with transparent objects. The present invention uses a plurality of MICs in combination with GIPPs as well as other elements in order to provide three-dimensional animation with Gouraud shading.

SUMMARY OF THE INVENTION

The apparatus of the invention provides a raster graphics generator (RGG) including a parallel polygon/pixel rendering engine for a digital map capable of producing real-time linear shaded, three dimensional, raster graphics for video generation. The invention is suitable for use with avionic display systems, particularly digital map displays which include an instruction and interpreter unit and an image scanner. The apparatus of the invention comprises a raster engine, a memory interface and a bit mapped memory. The raster engine further includes a raster engine control and generic interpolation polygon processor interface, an edge interpolator, a line interpolator and a controller for the edge and line interpolators. The raster engine control and GIPP interface is electrically connected to receive data from the instruction interface unit and is further electrically connected to the edge interpolator and interpolator controller. The edge interpolator is adapted to receive data from the raster engine control and the line interpolator is electrically connected to receive data from the edge interpolator. A first edge pipeline is connected to a second output of the raster engineer control and GIPP interface and a second edge pipeline is connected to an output of the first edge pipeline as well as an output of the edge interpolator. An output from the second stage of the edge pipeline and a plurality of outputs from the line interpolators are then fed to a memory interface which is connected to receive data from the plurality of outputs. The memory interface accepts color, linearly shaded, three dimensional pixel data from the raster edge. The memory interface controls data transfers between the raster engine and the memory interface with a hold control signal. A bit mapped memory controller is connected to the memory interface. A bit mapped memory is also connected to receive data from the memory interface and control signals from the bit mapped memory controller. The bit map memory controller controls the memory interface components and the bit map memory during both normal and test modes.

In the preferred embodiment of the invention, the edge interpolator is comprised of a plurality of generic interpolation pipeline processors or GIPPs. The edge interpolators may preferably comprise at least two GIPPs while the line interpolators may preferably comprise at least four GIPPs. The memory interface is preferably comprised of a plurality of memory interface chips (MICs). The bit mapped memory controller is preferably comprised of programmable logic arrays. A plurality of test interface units may be included in the design of the raster engine in order to facilitate manufacturing and debugging procedures should a failure occur.

It is one object of the invention to provide a raster engine which has the capability for simultaneously rendering multiple polygon lines for a single polygon.

It is another object of the invention to provide a streamlined memory interface for use in a three dimensional graphics system with an animation capability.

It is yet another object of the invention to provide a raster engine which uses an interleaved memory wherein each parallel pipeline works with a portion of the memory.

It is yet another object of the invention to provide a raster engine for a digital display system which significantly increases throughput of data for rendering images.

It is yet another object of the invention to provide a parallel pipeline architecture which is expandable and capable of meeting increased system requirements.

It is yet another object of the invention to provide a raster engine which is modular in design allowing a system design to be downsized or enlarged as required by the display system being serviced by the raster engine.

Other objects, features and advantages of the invention will become apparent to those skilled in the art through the description of the preferred embodiment, claims and drawings herein wherein like numerals refers to like elements.

DESCRIPTION OF THE PREFERRED EMBODIMENT

Figures 2A, 2B, 3A:
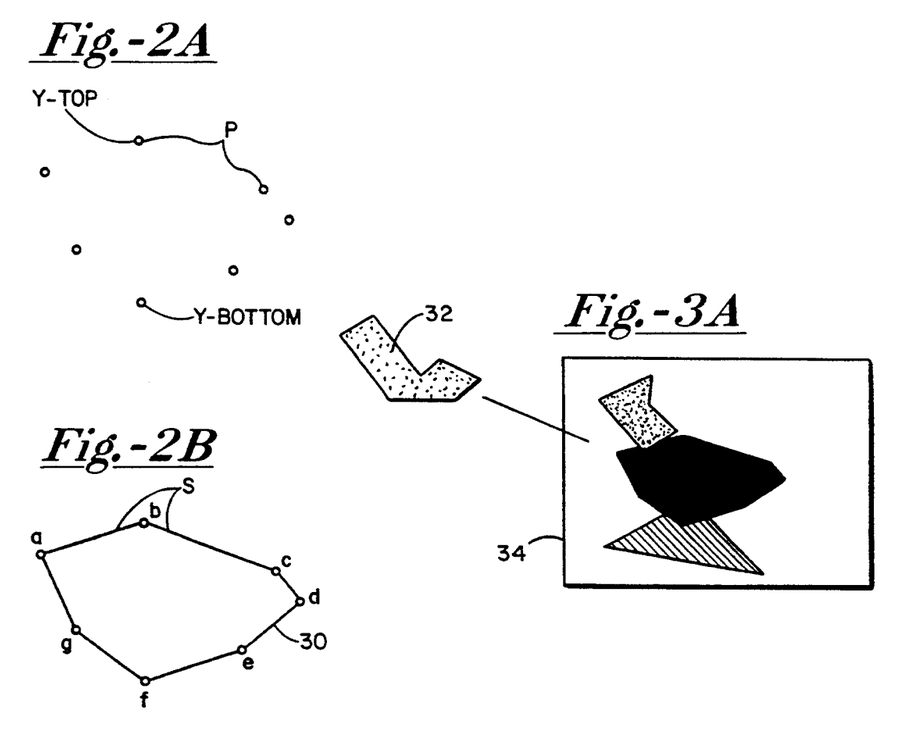
FIGS. 2A, 2B and 2C schematically illustrate the computer algorithm employed by the invention for filling and shading polygons.
FIGS. 3A and 3B are conceptual illustrations showing the placement of a rendered polygon into a bit mapped memory as employed by the invention.
Figure 2C:
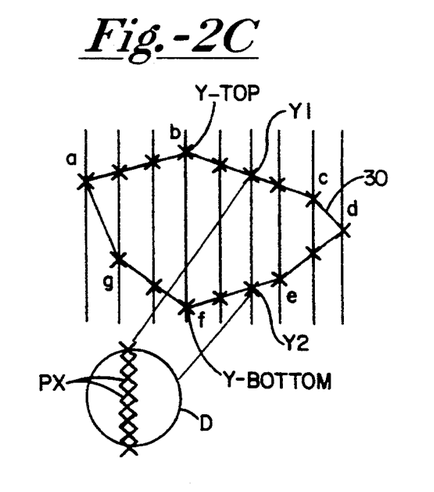

FIGS. 2A, 2B, and 2C sequentially illustrate the computer algorithm employed by the invention to generate polygons used for rapidly providing three dimensional Gouraud shaded objects. Referring now to FIG. 2A, the raster engine initially accepts data representing a number of points, a, b, c, d, e, f and g, generally designated P. Each point is described by cartesian coordinates (X, Y, Z), color coordinates (R, G, B), a translucency coefficient (K) and an invisibility factor (T). The points, P are sorted from top to bottom using the Y coordinate as the sorting discriminator. As shown in FIG. 2A, the points generally define a convex polygon.

Now referring to FIG. 2B, in a second step the points which describe the polygon's sides are calculated by linearly interpolating the Y and Z coordinates and R, G and B across the X coordinates of the points. Those skilled in the art will recognize that X, Y and Z coordinates represent Cartesian coordinates while the color descriptors R, G and B represent green and blue color values. In this way the sides, S, of the polygon are determined.

Figure 1:
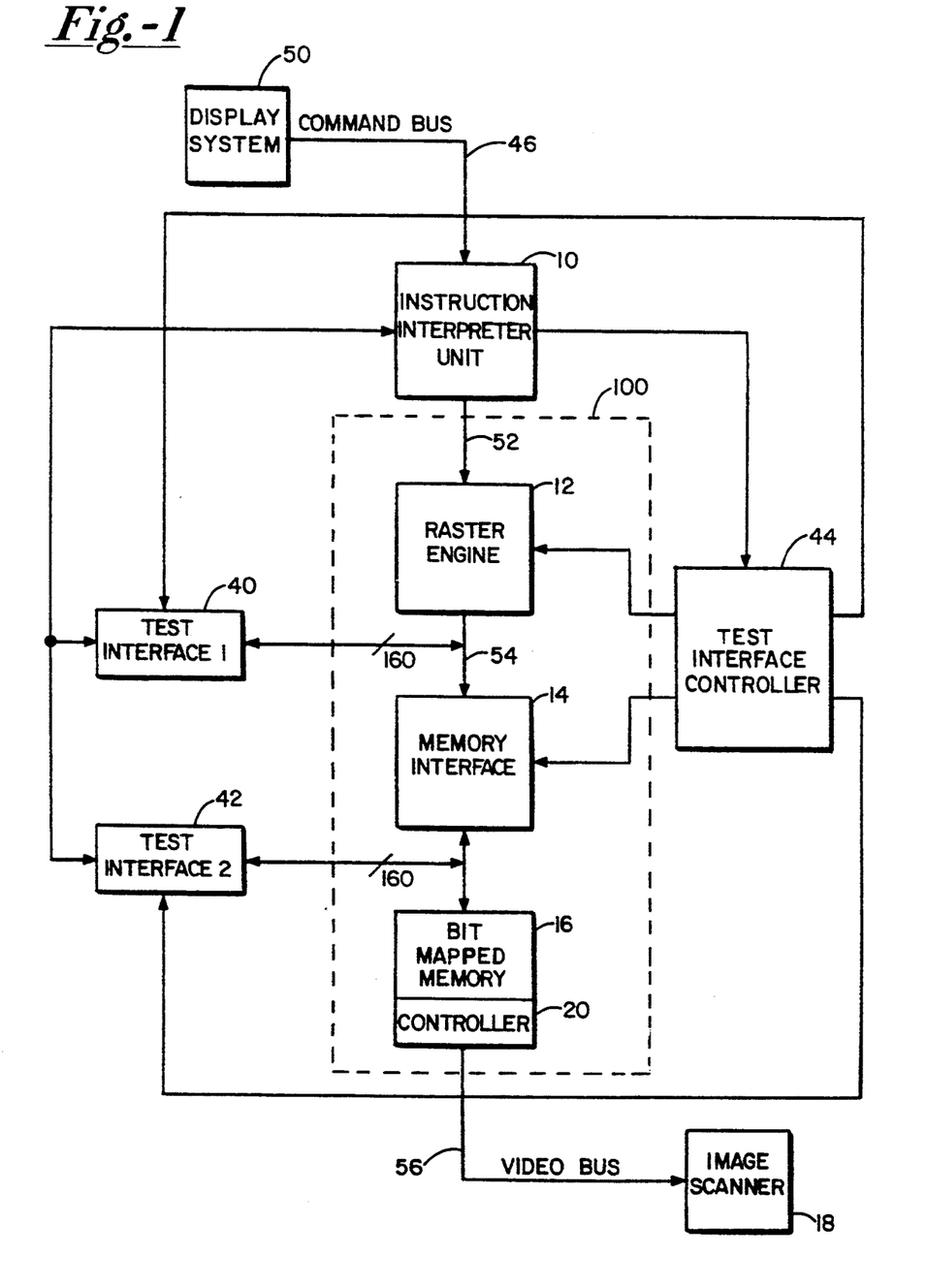
FIG. 1 is a representation of a block diagram of one embodiment of a raster graphics generator as provided by the invention.

The invention is explained herein by means of a description of the preferred embodiment. Those skilled in the art will understand that the description is intended to be by way of illustration and not limitation of the invention and that alternate means may be employed to carry out the invention. FIG. 1 shows a block diagram of one embodiment of the polygon/pixel rendering engine of the invention is shown as used in a display system including an instruction interpreter unit (IIU) 10 and an image scanner 18. The raster graphics generator 100 of the invention comprises a raster engine 12, a memory interface 14, and a bit mapped memory 16 having a controller 20. The invention may advantageously include test interfaces 40, 42 and 44. The instruction interpreter unit 10 (IIU) provides an interface for the command bus 46, accepts and processes the graphics commands as provided by the display system 50, and outputs polygon commands to the raster engine via bus 52.

The raster engine 12 receives polygon commands via bus 52 from the IIU and outputs linearly shaded, color raster graphics video to the memory interface via bus 54. The memory interface is connected to receive the raster graphics video signals from the raster engine via bus 54. The memory interface also implements hidden surface removal and transparency processes as required for the polygons rendered by the raster engine. The memory interface also outputs this processed data to the bit mapped memory 16. The bit mapped memory (BMM) 16 has two purposes. It is used by the memory interface as a read/write frame buffer to perform transparency and hidden surface removal processes, and it interfaces with the video bus 56, providing colored, transparent, linearly shaded, three dimensional raster graphics video signals to the image scanner 18 via video bus 56. The controller 20 provides control signals to the memory interface and BMM during both normal and test modes.

The test interface units 40 and 42 and test interface controller 44 may be advantageously included in a system utilizing the apparatus of the invention for facilitating manufacturing and debugging of large scale integrated circuits embodying the apparatus of the invention. In some cases it may be preferable to build the system as an application specific integrated circuit (ASIC) from gallium arsenide semi-conductor material.

Now referring to FIG. 2C, for each value of Y between Y-TOP and Y-BOTTOM, two endpoints exists as defined by the sides, S, calculated in the above step. Next, in order to calculate the values of the pixels which fill the polygon, a linear interpolation between each of these two points across Y is accomplished for the Z coordinate and the R, G and B parameters. This interpolation is schematically shown in projection D which is comprised of a number of pixels, PX, representing interpolated points between coordinates Y1 and Y2. In this way the entire polygon 30 is shaded. After shading the polygon is added to the bit mapped memory described in detail below.

Figure 3B:
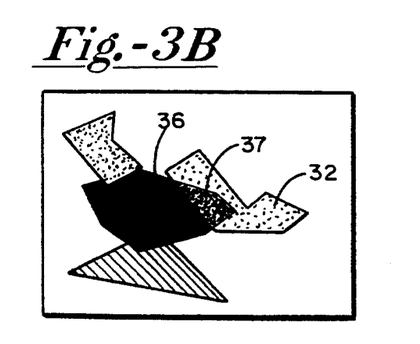

FIGS. 3A and 3B conceptually illustrate the addition of a polygon 32 to a bit mapped memory 34 already containing several rendered polygons. The polygon 32, in this example, exhibits transparency characteristics as can be shown in FIG. 2B since the polygon 36 has an area 37 which is visible through the overlaid polygon 32 which is overlaid on polygon 36. In a typical digital map display, several polygons are typically joined in this fashion to create images and symbols representing objects in the real world such as terrain, trees, vehicles, etc.

Figure 4:
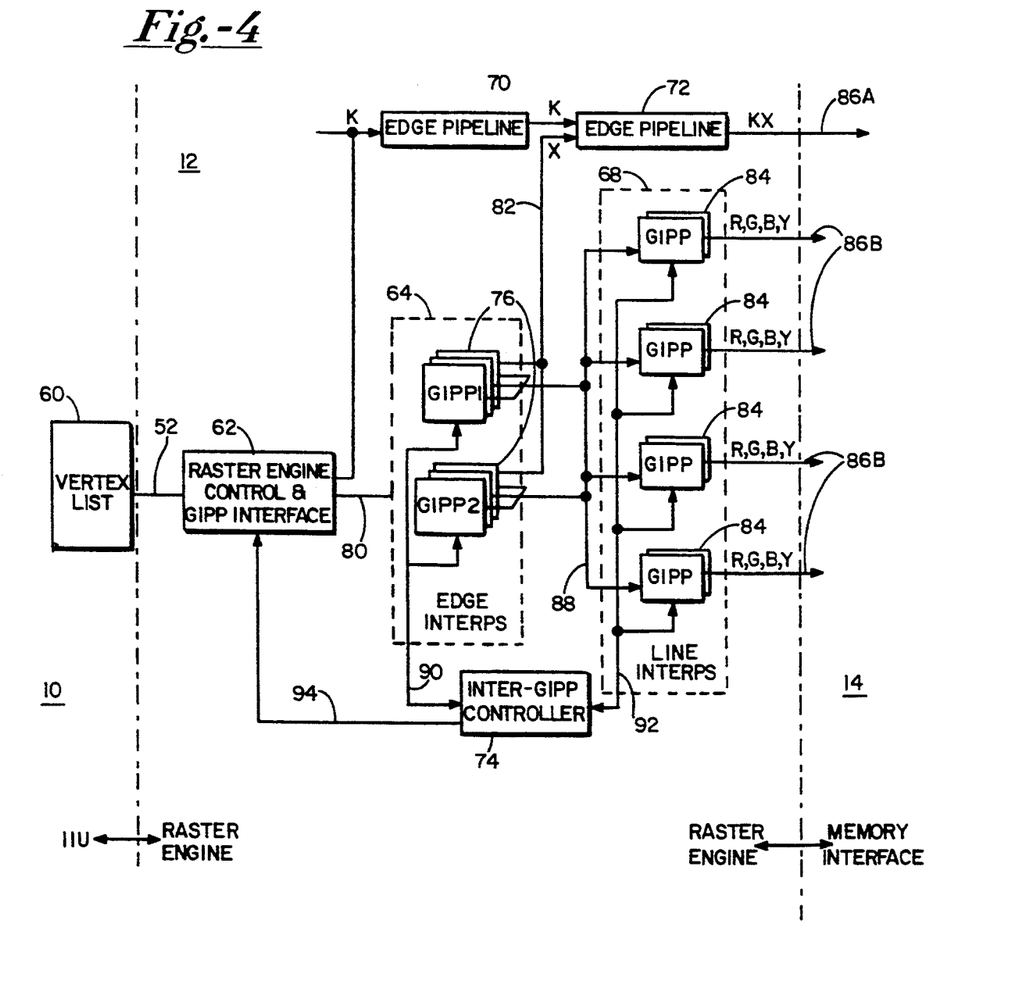
FIG. 4 is a block diagram of one example of a raster engine as provided by the invention.

Referring now to FIG. 4, a block diagram is shown illustrating the raster engine 12 in more detail as well as the interfaces between the raster engine and the IIU and memory interface 14. The IIU 10 further includes a vertex list 60. The raster engine 12 is further comprised of the raster engine control and GIPP interface 62, edge interpolator 64, line interpolators 68, a first stage edge pipeline 70 and a second stage edge pipeline 72. The raster engine control and GIPP interface (REC) 62 is advantageously implemented in a programmable logic device. The REC reads data transmitted on bus 52 from the vertex list 60 which is typically comprised of an instruction list RAM further including at least two. The REC reads the data from the instruction list RAM on an as needed basis to provide data line 80 as required by the edge interpolators 64. Serving as a controller between the edge interpolators and the line interpolators is inter-GIPP controller 74. The REC is further explained below with reference to the REC diagram shown in FIG. 8.

Still referring to FIG. 4, for a three dimensional color graphic application, the edge interpolators 64 are preferably comprised of a first and second edge interpolators GIPP1 and GIPP2 which are each further comprised of at least three GIPP chips. Each GIPP chip can interpolate two axes at a time across the coordinate. Therefore, six of these chips are used for the edge interpolation function. Each of the chips provides edge data, in this case along the X axis to the second stage of the edge pipeline 72 via bus 82. In a similar fashion in the preferred embodiment, there are four line interpolators 84 each comprised of at least 2 GIPP chips. Each line interpolator 84 linearly interpolates Z, R, G and B across the Y coordinates. The line interpolators have outputs 86B which feed the interpolated data into the memory interface 14.

The inter-GIPP controller 74 is electrically connected between the edge and line interpolators. The inter-GIPP controller coordinates the transfer of data between the edge interpolators and the line interpolators and monitors the operation of the edge interpolation GIPP chips. Processing of pixel data interior to the polygons is evenly distributed among the four line interpolators by decoding the two least significant bits, (LSBs) of each pixel's X coordinate as the data is clocked out of the edge interpolator onto an inter-GIPP bus 88. Since both edge interpolators share bus 88, the inter-GIPP controller 74 also includes a multiplexer for multiplexing the data by controlling the output enables of the GIPPs via control lines 90 and 92. The inter-GIPP controller further monitors the same two bits of each X coordinate from each of the two edge interpolators 76 to ensure that the data is synchronized as it is passed to the line interpolators. If an error is detected in this synchronization check, error recovery is handed off to the REC 80 through a discrete output 94.

Figure 8:
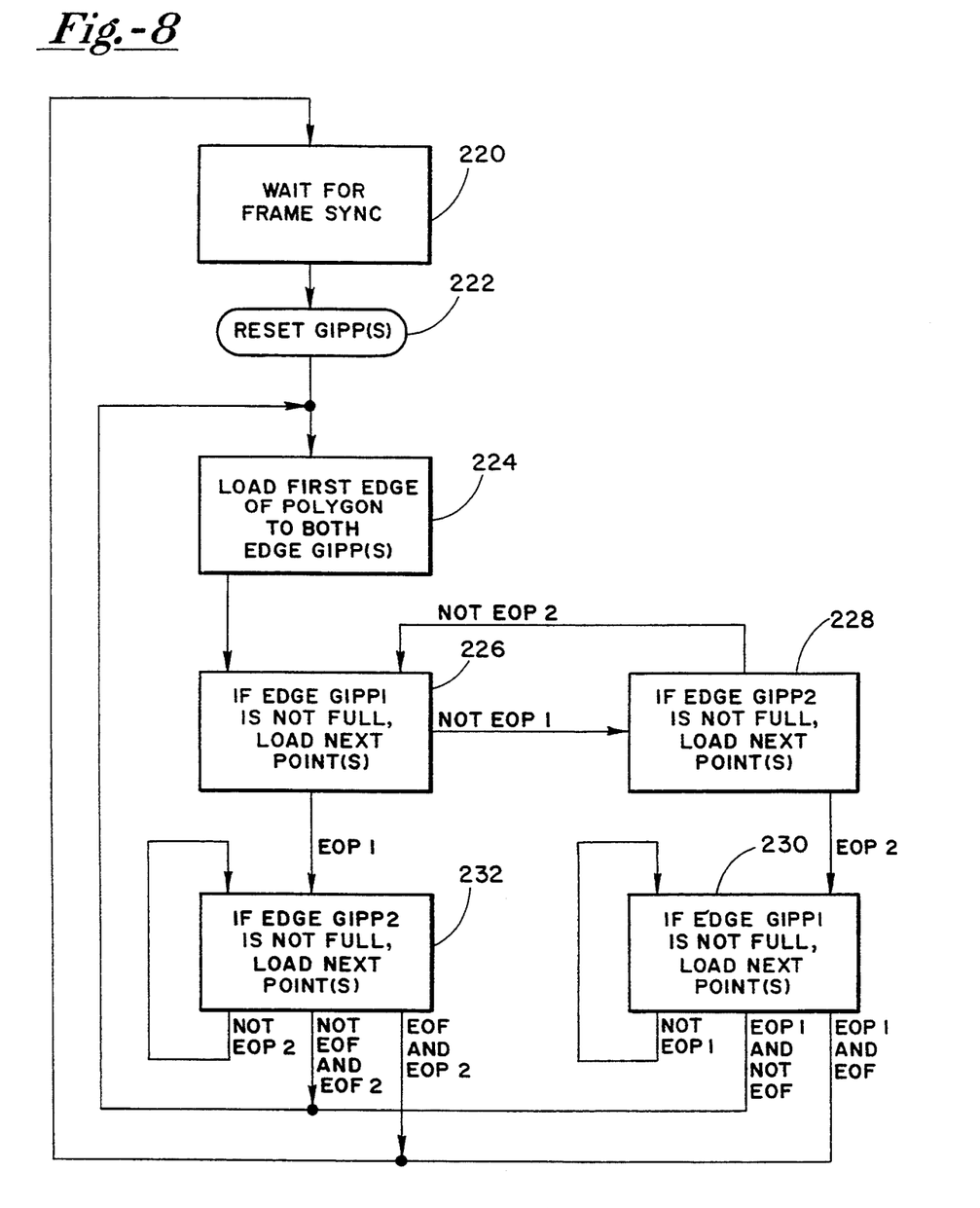
FIG. 8 is a flow chart of the control process of the raster engine controller as used in the preferred embodiment of the invention.

Referring now to FIG. 8, a detailed flow chart of the controlled process as implemented by the raster engine controller 62 is shown. In the preferred embodiment of the invention, the REC reads from two instruction lists which are contained in the vertex list 60. The first instruction list corresponds to information required for the first edge interpolator GIPP1 and the second corresponds to information required for edge interpolator GIPP2. When a new polygon is initiated, two points are loaded to each of the edge interpolators. After that, each new vertex is JOIN loaded to the last point in accordance with the JOIN function of the GIPP chips as described in Miller, et al. End of file (EOF) and end of polygon (EOP) comprise data in the form of "TAGS" stored in the vertex list 60. As shown in FIG. 8, at step 220, the raster engine controller waits for a frame synchronization signal prior to resetting the edge interpolator GIPPS at step 222. After resetting the edge interpolator GIPPS at step 222, the first edge of the polygon is loaded to both edge interpolators at step 224. The raster engine controller will not overload the GIPPS, therefore, at steps 226 and 228.

Referring now continuously also to FIGS. 2B and 2C together with FIG. 8, the polygon abcdefg of FIG. 2B, for example, may be divided into two display lists. The first display list would include vertices a, b, c and d and the second display list would include vertices a, g, f, e and d. The raster engine controller would read the first display list into the first set of edge GIPPs and the second display list into the second set of edge GIPPS. In this example, point d would be tagged with an end of polygon signal 1 (EOP1) to signify the end of the first display list to the raster engine controller. It would also be tagged with an end of polygon 2 (EOP2) bit to signify the end of this second display list. Note that in this example, the first display list will signal end of polygon prior to exhausting the second display list. Note that the end of polygon signals EOP1 and EOP2 do not refer to separate polygons but two separate display lists describing the top and bottom of a single polygon. In an alternate embodiment of the invention, the polygon could have been divided from left to right using the top most and bottom most values, namely b and f, as the beginning and end of the polygon markers. In the preferred embodiment, the point d is tagged once with a single bit to denote end of polygon. The controller recognizes the end of display list 1 or display list 2 as the case may be, through correlation with the time at which the signal is received. The raster engine controller, therefore, proceeds to process the polygon edges at steps 226 and 228. At step 226 if the first set of edge GIPPs is not full it loads the next points from display list 1, if the display list is not exhausted, it proceeds to load edge GIPP2 with the next points from display list 2 at step 228. If step 228 encounters an EOP2 signal the process proceeds to step 230 which checks to see if the first set of edge GIPPs is full until an EOP1 signal is received signifying the exhaustion of the display list for edge GIPP1. Similarly, if step 226 encounters an EOP1 signal, the raster engine controller proceeds to finish filling the set of second edge GIPPs until an EOF or EOP2 signal is received. An EOF signal signifies the exhaustion of all polygons in the construction list memory and returns control to step 220 to await the next frame signal. In this way, both edge GIPP interpolators interpolate the edges from left to right with the first edge interpolator, interpolating the top most points and the second edge interpolator interpolating the bottom most points. After the edges have been interpolated and the EOP signals have been received for the top and bottom (display list 1 and display list 2), the information is passed to the line interpolators which interpolate in a similar manner across the Y coordinates of the system as explained with reference with FIG. 2C above.

Figure 5:
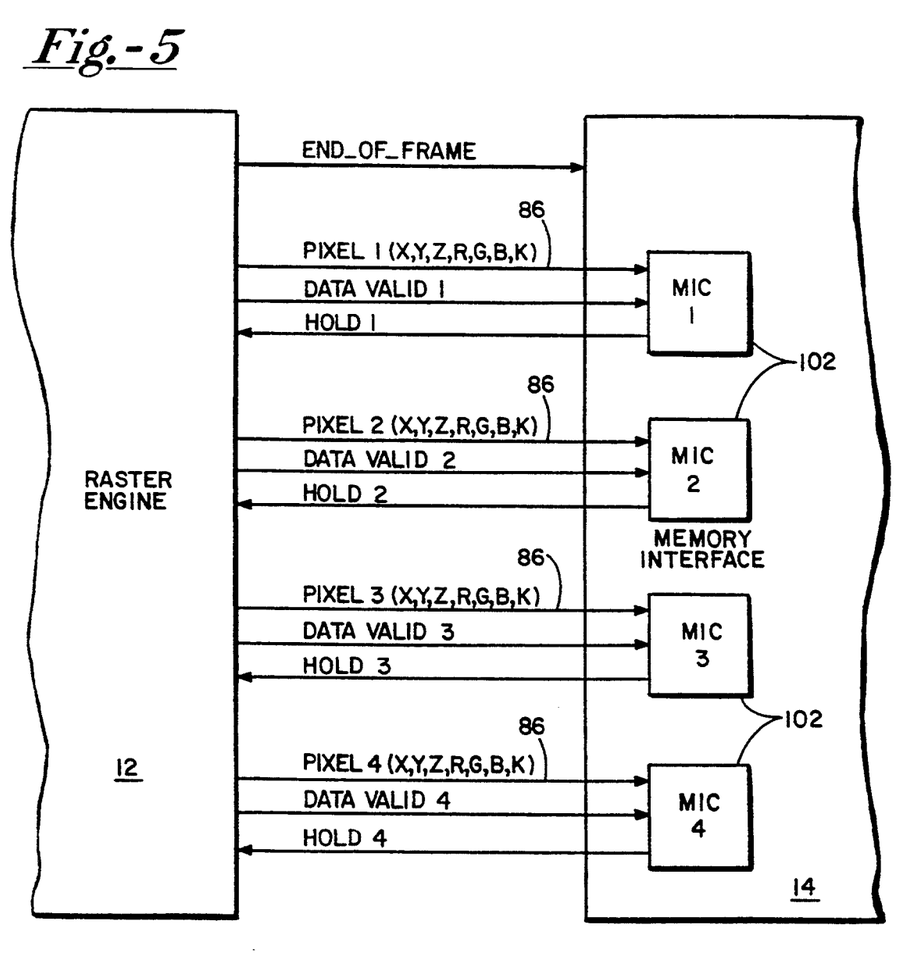
FIG. 5 illustrates the interface connections between the raster engine and memory interface devices as used in one embodiment of the invention.

Referring now to FIG. 5, the interface connections between the raster engine 12 and the memory interface 14 are shown in more detail as are the elements comprising the memory interface. The memory interface as implement in one embodiment of the invention comprises at least 4 MIC chips 102. The interface lines shown are consistent with those described by Snodgrass, et al. The memory interface 14 accepts color, linearly shaded, three dimensional pixel data from the raster engine 12. The memory interface controls data transfers between the raster engine and the memory interface with the holds control line signals, HOLD 1, HOLD 2, HOLD 3 and HOLD 4.

Figure 6:
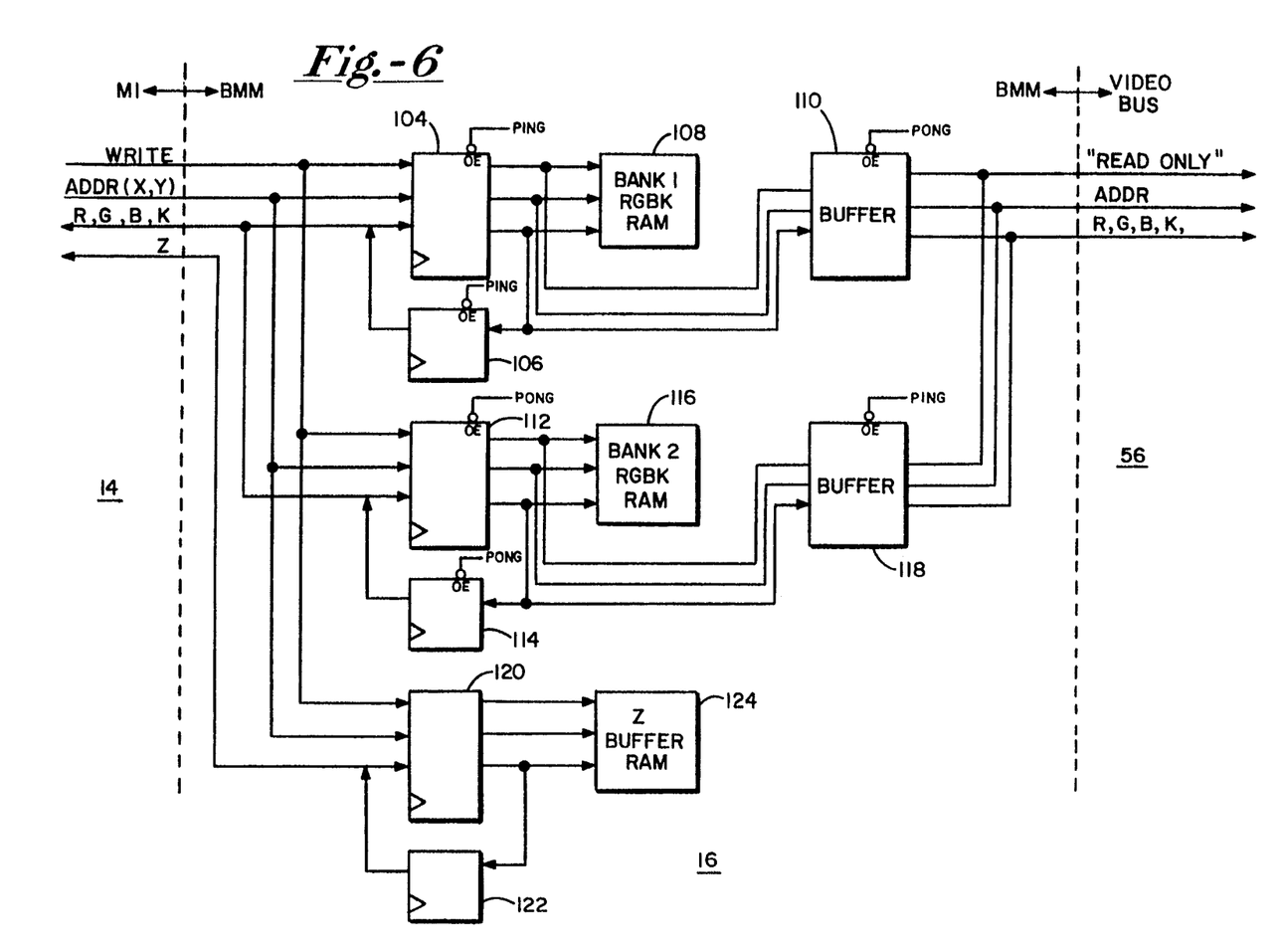
FIG. 6 is a block diagram representation of the bit mapped memory quarter as used in one embodiment of the invention.

Referring now to FIG. 6, a more detailed block diagram of a portion of the bit mapped memory is shown with the interfaces between the bit mapped memory and the memory interface and the bit mapped memory and the video bus. The portion shown in FIG. 6 is one of four identical sections of the bit mapped memory. Referring now continuously to FIGS. 5 and 6, note that if a hold signal is asserted, the raster engine will not send new data to the memory interface. The memory interface reads pixel data from the BMM which is located at the same screen coordinates as the pixel data received from the raster engine. The memory interface performs hidden surface removal by comparing the Z-coordinates of the corresponding pixels. For solid objects, the pixel that is "in front" of the other (i.e., the pixel occupying a place on the display screen which is closer to the front of the screen) shall be written into the BMM. The memory interface implements transparencies for transparent objects by combining the pixel data as follows:

$$Pn\ (xn, yn, zn, rn, gn, bn, kn) = \text{new pixel}$$
$$P\ (x, y, z, r, g, b, k) = \text{pixel from RE}$$
$$Pm\ (xm, ym, xm, rm, gm, bm, km) = \text{pixel from BMM}$$
(note: x-xm and y-ym by definition)
Then:
$$rn = k * r + (1 - k) * rm$$
$$gn = k * r + (1 - k) * gm$$
$$bn = k * b + (1 - k) * bm$$
$$kn = 1 - (1 - k) * (1 - km)$$

The new pixel is written into the BMM by the memory interface. The memory interface performs self-test or BMM test at the command of the IIU. The memory interface is also responsible for clearing the BMM before processing the next display's information. The color, Z-coordinate, and transparency initial settings are configured by the IIU in a well-known manner. In one embodiment of the invention, the memory interface operates at 12.5 MHz for processing data and 25 MHz for memory accesses. The memory interface processes a maximum of 50 million pixels per second.

The BMM provides the memory interface with a frame buffer which is used by the memory interface as a read-modify-write module to perform hidden surface removal and transparency functions. The BMM is shown in FIG. 6 as comprised of a PING-PONG frame buffer memory including PING registers 104 and 106 and RAM 108, as well as output buffer 110. The PONG section of the memory comprises registers 112, 114 and RAM 116 together with output buffer 118. A third section comprises a Z buffer including registers 120, 122 and RAM 124. An example of a digital display system employing such a PING-PONG memory scheme is further described in the applicant's copending patent application Ser. No. 192,798 for a Digital Map Display, by Dawson, et al. filed May 11, 1988 and incorporated herein in its entirety by this reference. The use of Z-buffers for hidden surface removal and transparency processing is well-known in the art. The BMM also provides a video bus interface for the rendering engine. A space is provided for color values and transparency factors. At any given time, one half of the memory is used by the memory interface and the other half by the video bus. The BMM memory is frame sized and provides space for Z-coordinates. The BMM operates in a pipe-line fashion for the memory interface and an asynchronous fashion for the video bus.

The memory interface 14 to BMM 16 interface is comprised of a bi-directional data bus and memory controlled discrete lines. The memory interface 14 reads or writes pixel data in 25 MHz cycles. The pixel data is defined by its address (screen coordinates (X, Y)), its Z-depth, its color (R, G, B) and its transparency factor (K). The coordinate system is right handed with the origin at the upper left hand corner of the view volume. The Z-depth represents 256 discrete levels which range linearly from closest to aircraft (Z=0000 0000) to farthest from aircraft (Z=1111 1111). The color values (R, G, B) each represent eight discrete color values ranging from no color (color=0000) to full color (color=1111). The range of the transparency factor (K) is shown in Table 1 below.

TABLE 1

Transparency Factor Variable Range for Memory Interface to BMM Interface

| K | Numerical Value |
|---|---|
| 000 | 0.00 |
| 001 | 0.25 |
| 010 | 0.50 |
| 011 | 0.75 |
| 100 | 1.00 |
| 101 | unused |
| 110 | unused |

TABLE 1-continued

Transparency Factor Variable Range for Memory Interface to BMM Interface

| K | Numerical Value |
|---|---|
| 111 | unused |

The memory interface outputs four control signals to the BMM: WRITE-EN*, CLK-EN*, READ*, and WRITE*. These signals are described by Snodgrass.

Figure 7A:
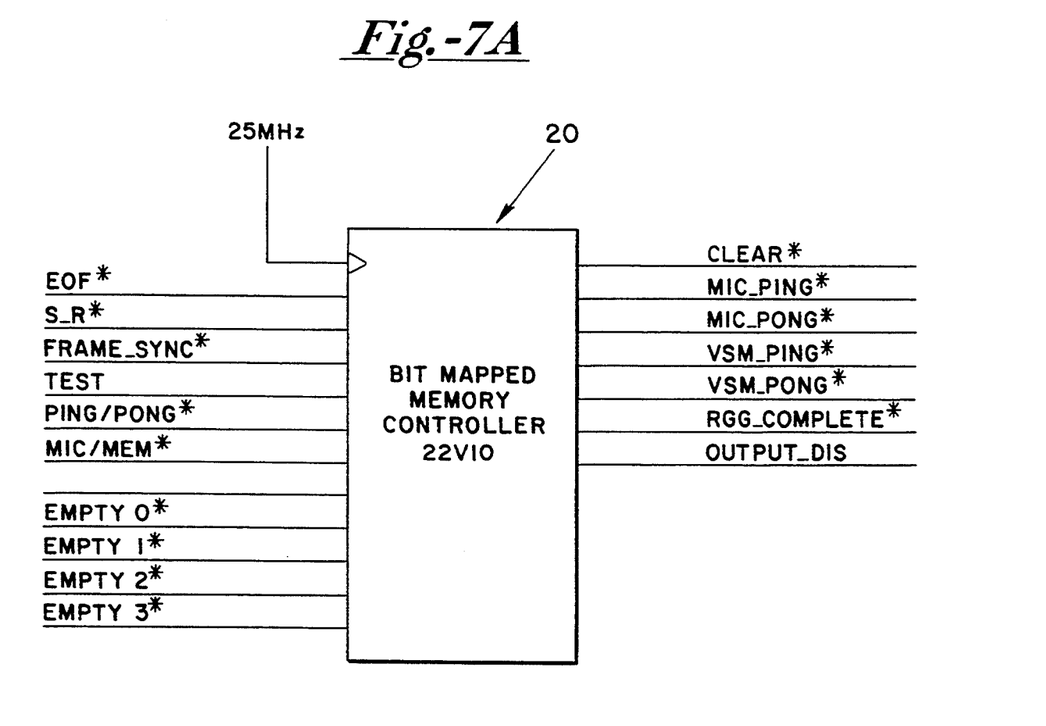
FIG. 7A is a block diagram representation of the BMM controller provided by the invention.

Now referring to FIG. 7A, a block diagram of the BMM controller 20 as employed by the invention is shown. The BMM controller 20 is preferably implemented in a programmable array logic device (PAL). The BMM controller interfaces the raster graphics generator with the image scanner 18 and provides control signals to the MIC within the memory interface. It also provides control signals to the BMM during both normal operational and test modes.

Figure 7B:
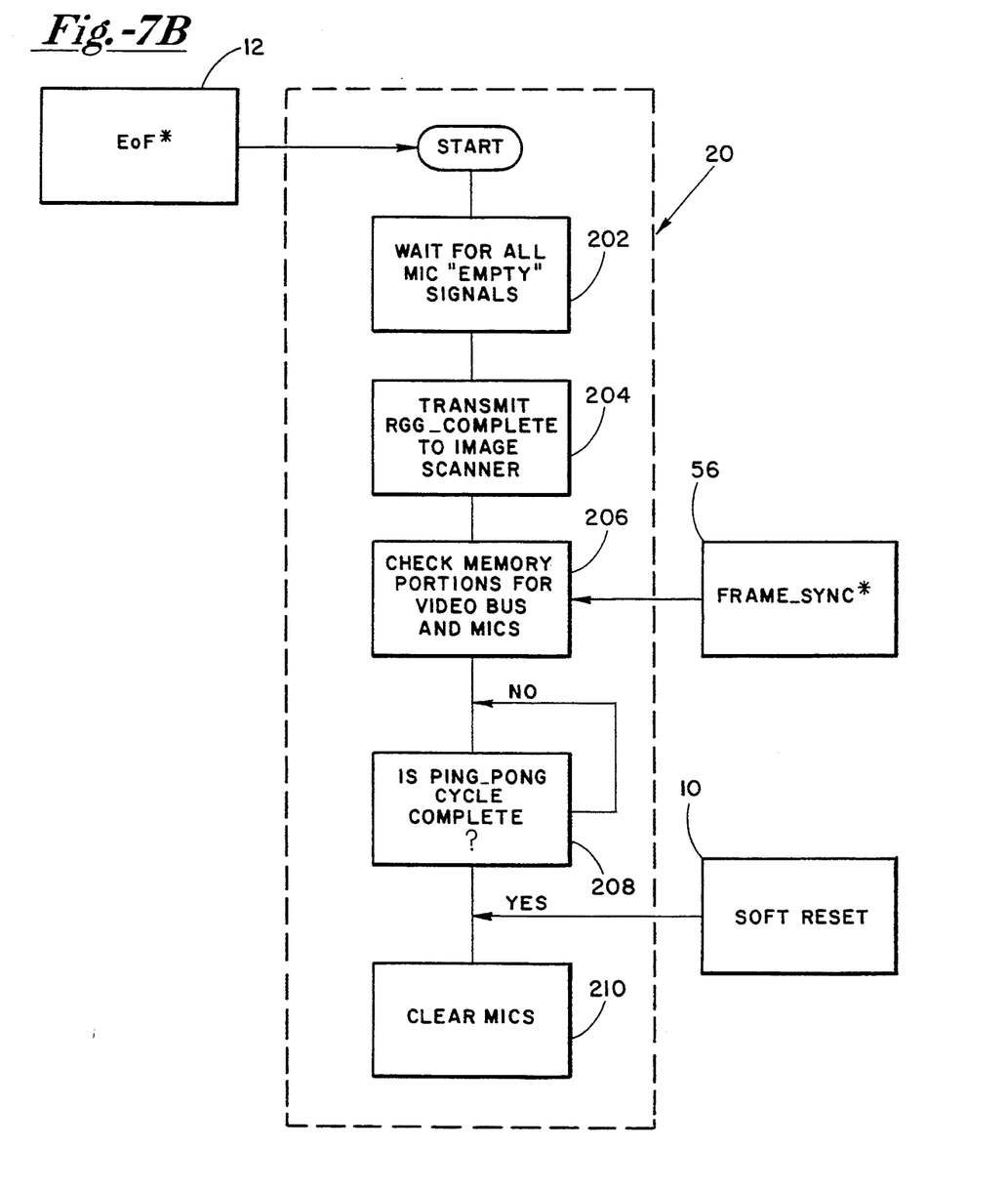
FIG. 7B is a flow chart of the initialization cycle of the BMM controller as provided by the invention.

FIG. 7B shows a flow chart diagram of an initialization method processed by the BMM controller in the preferred embodiment of the invention. In normal operation, the BMM controller 20 waits for an end of frame (EOF*) signal from the raster engine. When this occurs, it then waits at step 202 for all the empty signals (EMPTY0*, EMPTY1*, EMPTY2*, and EMPTY3*) on all four MIC chips to go low. This event indicates that all the pipeline is empty. At step 204, the BMM controller asserts a signal called RGG_COMPLETE* to the image scanner. This signal is applied when the raster graphics generator has finished processing all the information for the display in a predetermined allotted time frame.

The video bus controls the PING-PONG function of the BMM by asserting a signal called FRAME_SYNC*. Upon receiving this signal, the BMM controller changes the appropriate control signals so as to allow the video bus and the MICs to change which half of the PING-PONG memory they are accessing at step 206. The BMM controller determines which half of the memory the MICs can access and which half of the memory the video bus can access. The MICs and the video bus work simultaneously on opposite halves.

This is controlled by the states of the MIC_PING*, MIC_PONG, VSM_PING* and VSM_PONG signals. After the PING-PONG cycle is completed at step 208, the controller asserts a CLEAR* signal at step 210 which is transmitted to the MIC chips. This causes the MICs to initialize the half of memory they are allowed access. CLEAR* is deasserted when the MICs signal the completion of initialization by asserting all the MIC empty bits. Upon completion of the initialization cycles, the MICs and the BMM are ready to process the new image. The cycle repeats itself for each new image.

The soft reset (S_R,) signal is transmitted from the IIU in some cases. Upon receiving this signal, CLEAR* is asserted which causes the MICs to reset and then clear the BMM.

Referring again to FIG. 7A, three test interface signals are also included as inputs to the BMM controller, namely, TEST, MIC/MEM* and PING-PONG*.

The three test interface signals are only used when the raster graphics generator is in test mode. The TEST pin is asserted by the TI during test mode. The MIC/MEM, signal is used to signify that the TI is examining the output of the MICs or interfacing with the BMM. If this signifies the latter, the third pin, PING/PONG* is used to select which half of the BMM is being accessed by the IIU. If the BMM is selected, the controller tristates the MICs' outputs by asserting an OUTPUT_DIS signal.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. An apparatus for rendering three dimensional objects wherein the three dimensional objects are comprised of a plurality of polygons, wherein the plurality of polygons further comprise at least one complex polygon and wherein each complex polygon includes more than three vertices, the apparatus comprising:

(a) a means for interpreting instructions, the interpreting means having an output for transmitting vertex data, the vertex data includes a list of vertices for at least one complex polygon having more than three vertices and each vertex is further comprised of X and Y coordinates in a cartesian coordinate system having X, Y and Z axes;

(b) means for scanning images, the scanning means having an input;

(c) raster engine means comprising, i. a raster engine control interface having an input connected to the interpreting means output for receiving the vertex data, wherein the raster engine control interface has a raster engine control output for transmitting the vertex data;

ii. means for interpolating edges connected at a data input to the raster engine control output, the edge interpolator means further having a control input, the edge interpolating means is loaded at its data input with the vertex data for a selected complex polygon by the raster engine control interface and interpolates the vertex data across the X axis so as to generate interpolated edge data for the selected complex polygon at an output;

iii. interpolator controller means for synchronizing interpolated edge data transfer, having first and second control signals, wherein the first control signal is coupled to the control input of the edge interpolator means for controlling the output of the interpolated edge data from the edge interpolating means; and iv. means for interpolating lines connected at a control input to the second control signal of the interpolator controller means wherein the second control signal controls the input of data to the line interpolating means, the line interpolating means being further connected at a data input to the output of the edge interpolator means, wherein the line interpolating means is loaded on its data input with the interpolated edge data for the selected complex polygon, and interpolates the interpolated edge data across the Y axis so as to generate interpolated pixel data for the selected complex polygon on an output; and d. means for generating objects, the object generating means connected at a first input to the output of the edge interpolating means and at a second input to the output of the line interpolating means wherein the object generating means stores the interpolated edge data and the interpolated pixel data in an interleaved manner so as to output display data, representing three dimensional objects, the three dimensional objects comprised of a plurality of said polygons comprising at least one complex polygon, on an output connected to the input of the image scanning means.

2. The apparatus of claim 1 wherein the means for generating objects further comprises:

a. memory interface having a first input connected to the output of the edge interpolating means and having a second input connected to the output of the line interpolating means and having a plurality of outputs for transmitting the interpolated edge and pixel data;

b. bit mapped memory controller for providing memory control signals; and c. bit mapped memory having a control input connected to the bit mapped memory controller control signals and having a plurality of data inputs connected to the plurality of outputs of the memory interface.

* * * * *